(12) United States Patent
Chen

(10) Patent No.: US 8,052,953 B2
(45) Date of Patent: Nov. 8, 2011

(54) METHOD FOR RECOVERING SULFURIC ACID FROM CONCENTRATED ACID HYDROLYSATE OF PLANT CELLULOSE MATERIAL

(76) Inventor: Peihao Chen, Guangdong (CN)

( * ) Notice: Subject to any disclaimer, the term of this patent is extended or adjusted under 35 U.S.C. 154(b) by 0 days.

(21) Appl. No.: 12/678,634

(22) PCT Filed: Jul. 29, 2008

(86) PCT No.: PCT/CN2008/071801
§ 371 (c)(1),
(2), (4) Date: May 21, 2010

(87) PCT Pub. No.: WO2009/036674
PCT Pub. Date: Mar. 26, 2009

(65) Prior Publication Data
US 2010/0284900 A1 Nov. 11, 2010

(30) Foreign Application Priority Data
Sep. 18, 2007 (CN) .......................... 2007 1 0030293

(51) Int. Cl.
C01B 17/74 (2006.01)
C07H 1/06 (2006.01)
C07H 1/08 (2006.01)
C13K 1/02 (2006.01)

(52) U.S. Cl. ......... 423/522; 536/127; 127/37; 127/46.1; 127/47; 127/58

(58) Field of Classification Search .................. 536/127; 423/522; 127/37, 46.1, 47, 58
See application file for complete search history.

(56) References Cited

U.S. PATENT DOCUMENTS

| | | | | |
|---|---|---|---|---|
| 1,917,539 A | * | 7/1933 | Miles | 127/37 |
| 4,237,110 A | | 12/1980 | Forster et al. | 423/488 |
| 4,608,245 A | | 8/1986 | Gaddy et al. | |
| 5,562,777 A | | 10/1996 | Farone et al. | |
| 6,007,636 A | | 12/1999 | Lightner | 127/37 |

FOREIGN PATENT DOCUMENTS

| | | |
|---|---|---|
| CN | 101157445 A | 4/2008 |
| WO | WO 02/02826 A1 | 1/2002 |
| WO | WO 2006/085763 A1 | 8/2006 |

OTHER PUBLICATIONS

International Search Report dated Oct. 30, 2008, issued in corresponding international application No. PCT/CN2008/071801.
International Preliminary Report on Patentability, and Written Opinion of the International Searching Authority issued Mar. 24, 2010 in corresponding International Application PCT/CN/2008/071801.

* cited by examiner

*Primary Examiner* — Timothy Vanoy
(74) *Attorney, Agent, or Firm* — Ostrolenk Faber LLP

(57) ABSTRACT

A method for recovering sulfuric acid from concentrated acid hydrolysate of plant cellulose material is disclosed. In some of the examples, the concentrated acid hydrolysate is mixed with a liquid organic precipitant, with the sugars in the hydrolysate being precipitated and separated out. The remainder is sulfuric acid and an organic solvent solution. The organic solvent is then separated by distillation or extraction, thereby obtaining the pure sulfuric acid solution. This precipitation method can recover above 90% sugars and acids with a small amount of organic precipitant, which greatly reduces the recovery cost.

12 Claims, No Drawings

METHOD FOR RECOVERING SULFURIC ACID FROM CONCENTRATED ACID HYDROLYSATE OF PLANT CELLULOSE MATERIAL

CROSS REFERENCE TO RELATED APPLICATIONS

The present application is a 35 U.S.C. §371 National Phase conversion of PCT/CN2008/071801, filed Jul. 29, 2008, which claims benefit of Chinese Application No. 200710030293.8, filed Sep. 18, 2007, the disclosure of which is incorporated herein by reference. The PCT International Application was published in the Chinese language.

FIELD OF THE INVENTION

The present invention relates to a method for recovering sulfuric acid from a solution containing sulfuric acid, and more particularly to a method for recovering sulfuric acid from concentrated acid hydrolysate of plant cellulose material.

BACKGROUND OF THE INVENTION

Use of the renewable source cellulose to produce liquid fuels and chemical products can effectively relieve the problem that fossil fuels, such as petroleum, are becoming exhausted day by day. Use of plant cellulose material to produce liquid fuels and chemical products is to hydrolyze the cellulose into carbohydrates, such as oligosaccharides and monosaccharides, and then ferment the carbohydrates to produce liquid fuels and chemical products with microbe. The common methods for hydrolyzing the cellulose into the carbohydrates mainly include diluted hydrochloric acid hydrolysis method, concentrated sulfuric acid hydrolysis method, and enzyme hydrolysis method. The concentrated sulfuric acid hydrolysis method has advantages of low reaction temperature, high yield, little by-product, etc., and a shortcoming of high acid recovery cost.

The concentrated acid hydrolysis process of cellulose includes two stages: ① one is main hydrolysis process of hydrolyzing the cellulose into carbohydrates (namely oligosaccharides) in concentrated acid to obtain main hydrolysate; ② the other is post hydrolysis process of hydrolyzing the carbohydrates into glucose in dilute acid to obtain post hydrolysate.

The commonly used method of recovering sulfuric acid from the concentrated acid hydrolysate of plant cellulose material is electrodialysis method. However, this method is capital intensive and high in running cost. Then, new methods of recovering acid have been gradually developed, such as the process described in U.S. Pat. No. 5,562,777 of acid hydrolysis of celluloses and hemicelluloses materials: mixing the plant cellulose materials with a solution of 70~77% sulfuric acid by weight, keeping the reaction temperature in the range of 50° C.~80° C., adding water to dilute the acid to a concentration of 20~30% by weight, heating to a temperature of 80° C.~100° C. at atmospheric pressure, and hydrolyzing for 40~480 min, then separating the liquid portion from the solid portion, using strong acid cation exchange resins to adsorb sugars in the liquid portion and recover the acid, thereby obtaining 15% sugar by weight and 15% sulfuric acid by weight, finally evaporating water from the recovered dilute sulfuric acid to concentrate the sulfuric acid to a concentration of 70~77% by weight for reuse. However, because of the low adsorption capacity (2 meq/g) of the cation exchange resin, it is usually applicable to absorb and separate a minute amount impurities from a large amount production, or absorb and purity a small amount expensive production, for example the purification of amino acid or enzyme. While the sugars to be separated from the biomass hydrolysate are a large amount, easily reaching to tens of thousands ton to millions tons per year, therefore the cation exchange resin is incompetent obviously. what's more, the absorptive and elution process of the cation exchange resin is very slow. To attain such yield, it is undoubtedly need a large amount of cation exchange resin, and the complex composition in the biomass hydrolysate easily makes the cation exchange resin poisoned and invalid. Thus the process in fact is not practical.

U.S. Pat. No. 4,608,245 discloses a method of recovering the sulfuric acid by extraction comprising: mixing cellulose-containing materials with 70~72% sulfuric acid by weight for 10 min at 50° C.; keeping the radio of sulfuric acid to cellulose greater than 7.2; adding water to dilute the acid to a concentration of 40~50% by weight; keeping temperature at 90° C. for 2 min; separating the liquid portion from the solid portion to obtain lignin and hydrolysate; extracting the cooled hydrolysate for the first time with C4~C7 alcohols, such as heptanol, as the first extraction solvent to obtain a glucose-rich raffinate phase and an extract phase rich in the acid and the first extraction solvent; extracting the extract phase rich in the acid and the first extractant for the second time with a second extraction solvent, such as benzene, carbon tetrachloride or toluene, to obtain a raffinate phase containing water and sulfuric acid and an extract phase containing the first and the second extraction solvents; separating the first and the second extraction solvents by distillation with result that the recovered sulfuric acid, the first and the second extraction solvents are reusable; and finally neutralizing the small amount of residual sulfuric acid still contained in the glucose-rich phase with lime and then filtrating to obtain the glucose-rich phase without the sulfuric acid. According to the preferred embodiment of this invention, the hydrolysate obtained from the post hydrolysis process contains 55% sulfuric acid, 40.5% water and 4.5% sugar, so the radio of the sulfuric acid to the sugar equates to 12.2. The extract phase from the first extraction contains 79.4% heptanol, 14.5% sulfuric acid, 5.3% water and a minute amount of sugar, so the radio of the heptanol to the sulfuric acid equates 5.5. In the second extraction, the radio of benzene to heptanol equates 5. If 1 kg glucose needs to be extracted, the amount of benzene to be distilled is: 12.2×5.5×5=335.5 kg, and the burning energy is: 335.5 kg×434 kJ/kg=145607 kJ. However the energy produced by oxygenolysis of the 1 kg glucose is only 15945 kJ, which is far less than the burning energy for distillation the benzene. Obviously it is a process in which the output energy is far less than the input energy, therefore has no practical value. What's more, this process utilizes organic solvent as the second extraction solvent to separate the alcohol and the acid, so a large amount of the second extraction solvent needs to be recovered which, in turn, lead to high energy consumption.

Obviously, in the conventional process, the high cost of recovering sulfuric acid limits the concentrated sulfuric acid hydrolysis method to be used widely.

BRIEF SUMMARY OF THE INVENTION

Accordingly, an objective of the present invention is to provide an improved method for recovering sulfuric acid from concentrated acid hydrolysate of plant cellulose material.

An objective of the present invention is to provide an improved method for recovering sulfuric acid from concentrated acid main hydrolysate of plant cellulose material.

The method for recovering sulfuric acid from concentrated acid hydrolysate of plant cellulose material provided in the present invention belongs to precipitation method. The compositions in the hydrolysate include sugars (oligosaccharides and/or monosaccharides), sulfuric acid and water. In order to separate the sugars from the sulfuric acid and the water by precipitation, it needs to add some materials that have the property of reducing the solubility of sugars into the hydrolysate. Some organic solvents or some combinations of organic solvents have such property. The research discovers that in order to precipitate the sugars from the hydrolysate, two factors are principal, one of which is the content of water in the hydrolysate, the lower the content of water is, the easier the sugars precipitate; the other of which is polymerization degree of the sugars, the higher the polymerization degree of the sugars is, the easier the sugars precipitate. It is Obvious that the main hydrolysate contains less water and the sugars (oligosaccharides) in the main hydrolysate have higher polymerization degree, while the post hydrolysate contains more water and the sugars (monosaccharides) in the post hydrolysate have lower polymerization degree. Therefore, although precipitation can be operated both in the main hydrolysate and in the post hydrolysate, it is better to select the main hydrolysate as materials for recovering sulfuric acid.

According to one aspect of the present invention, the method for recovering sulfuric acid from concentrated acid main hydrolysate of plant cellulose material includes the steps as follows:

(1) mixing the concentrated acid main hydrolysate of plant cellulose material with a liquid organic precipitant which has a property of precipitating sugars, thereby precipitating sugars from the main hydrolysate;

(2) conducting solid-liquid separation, thereby obtaining a sugar precipitate and an organic precipitant solution containing sulfuric acid;

(3) separating the organic precipitant solution into a sulfuric acid solution and the liquid organic precipitant.

Preferably, the liquid organic precipitant is selected from any one of the group of alcohols, ethers, ketones and multifunctional compounds containing alcohol functional groups, ether functional groups or ketone functional groups. Alternatively, the alcohols are selected from water-miscible alcohols with 1~3 carbon atoms or water-immiscible alcohols with above 4 carbon atoms, the ethers are selected from tetrahydrofuran, 1,4-dioxane, glycol dimethyl ether, ethylene glycol diethyl ether, etc., and the multifunctional compounds containing alcohol functional groups, ether functional groups or ketone functional groups are selected from diethylene glycol monobutyl ether, diacetone alcohol, ethyl lactate, etc.

Alternatively, the liquid organic precipitant is organic solvent solution containing any one of the group of alcohols, ethers, ketones and multifunctional compounds containing alcohol functional groups, ether functional groups or ketone functional groups. For example, the ethanol, if added solvents that can not dissolve sugars such as benzene, etc., can improve the yield of sugars. Another example is that ethylene glycol monomethyl, which can dissolve in the hydrolysate solution and can not be utilized as a precipitant alone, if mixed with an amount of benzene or carboxylic acids, can be utilized as a precipitant.

In some example of the present invention, the precipitant includes a first component and a second component. The first component is an organic solvent that can completely dissolve main the hydrolysate (that is to say, the sugars, acid and water in the hydrolysate all can dissolve in it). The second component is an organic solvent that can reduce the solubility of the sugars. For example, amide organic solvents can completely dissolve the main hydrolysate and can be utilized as the first component. Mixed with an amount of nitrile, carboxylic acid or nitro compound organic solvents, the amide organic solvents can be utilized as a precipitant. Concretely, such as the mixture of N,N-dimethylformamide and anyone of acetonitrile, nitroethane and propionic acid can be utilized as a precipitant.

The sugar precipitate, optionally, can be washed with a liquid organic precipitant to remove the sulfuric acid absorbed on the precipitate. The washing liquid is mixed with acid hydrolysate, then the mixture is used for recovering the acids.

The sugar precipitate, optionally, can be washed with a liquid organic solvent, that can not dissolve water and sugars, to remove the precipitant absorbed by the sugar precipitate. The washout liquid is distilled and separated into the precipitant and the organic solvent for reuse. The organic solvent is selected from, such as benzene, toluene, chloroform, carbon tetrachloride, etc.

Preferably, the step of separating the organic precipitant solution into a sulfuric acid solution and the liquid organic precipitant is performed by ordinary distillation, vacuum distillation, reaction distillation, water extraction, or organic solvent extraction. The recovered sulfuric acid and the recovered liquid organic solvent can be reused.

The acid in step (1) is sulfuric acid or a mixture of acids mainly containing sulfuric acid, preferably sulfuric acid. If the acid is the mixture of acids mainly containing sulfuric acid, the mixture still contains phosphoric acid and/or hydrochloride and/or sulfonic acid.

The present method is also applicable for recovering sulfuric acid from general sulfuric acid solution containing sugars.

The present invention provides the precipitation method to separate and recover the acid from the hydrolysate. The method can recover almost all of the sugars and acids with a small amount of organic precipitant. For example, the method can recover above 90% sugars and acids with lower than 5 times of the amount of the hydrolysate, which greatly reduces the cost of acid recovery.

According to another aspect of the present invention, the method for recovering sulfuric acid from concentrated acid hydrolysate of plant cellulose material comprises the following steps of:

(1) mixing a water-immiscible alcohol with the concentrated acid hydrolysate of plant cellulose material, thereby separating sugars from the hydrolysate with a remainder of acid-alcohol solution containing sulfuric acid;

(2) contacting the acid-alcohol solution with water, thereby the sulfuric acid entering into the water phase from the organic phase;

(3) separating the organic phase and the water phase, thereby obtaining a sulfuric acid-water solution and the alcohol.

The water-immiscible alcohol is allowed to contain a little portion of other organic solvents, such as water-miscible alcohols, e.g. ethanol, n-propanol, etc., which would be dissolved a little in the sulfuric acid-water solution and can be vaporized out along with the steam when the dilute sulfuric acid-water solution is concentrated by distillation.

The step of contacting the acid-alcohol solution with water is performed by extracting in bathes or continuous extraction.

The sulfuric acid-water solution is concentrated by atmospheric distillation or vacuum distillation, thereby resulting the concentrated sulfuric acid, which is recycled for reuse.

The concentrated sulfuric acid hydrolysate of plant cellulose material is selected from main hydrolysate or the post hydrolysate obtained from concentrated sulfuric acid hydrolysis of plant cellulose materials, preferably the main hydrolysate.

In the present invention, the method to separate the sugars with the water-immiscible alcohol, water is utilized as an extractant to extract the sulfuric acid in the acid-alcohol solution, which obtains a high rate of extraction and a high sulfuric acid concentration. At the same time, This method avoids the use of poisonous, inflammable and explosive organic solvents and also avoids the energy consumption for recovering these organic solvents, thereby greatly reduce the cost of preparing the biofuel and biochemical production with plant cellulose materials.

Reference will now be made in detail to the preferred embodiments of the present invention. It is to be understood that the following examples are illustration only and the present invention is not limited thereto, it is contemplated that various modifications can be made without deviating from the spirit of the present invention.

DETAILED DESCRIPTION OF ILLUSTRATED EMBODIMENTS

Example 1

Cotton is the most pure cellulose material, and a single-celled or a single-fiber plant cellulose material with no hemicelluloses, so it is utilized as the standard material for test.

An initial hydrolysate solution is prepared with about 30% of the total acid 15.9 grams of 98% sulfuric acids by weight, that is 4.8 grams of 98% sulfuric acid by weight, and 1.1 g water, which are added together to obtain 80% sulfuric acid solution by weight. The initial hydrolysate solution is cooled to room temperature. The cotton is prepared in a quantity of 9.4 grams and containing about 10% by weight of water. At room temperature, 1 grams of the cotton are firstly added into the initial hydrolysate solution, with stirring, to dissolve the cotton, thereby resulting in a pale blue hydrolysate solution and the concentration of sulfuric acid is up to about 68% by weight. Then 1 grams of 98% sulfuric acids by weight are added into the hydrolysate solution, with stirring to mix well, thereby the concentration of sulfuric acid is up to about 72% by weight. Then 1 grams of the cotton are added, with stirring, to dissolve the cotton. Repeat the procedure of adding the sulfuric acid and the cotton until the last amount of all of 15.9 grams of 98% of the sulfuric acids by weight and 9.4 grams of the cotton are added, then the solution is put into 48~50☐ water and kept for 8 min, thereby resulting 26.4 grams of the light brown main hydrolysate solution containing 60% sulfuric acid by weight and about 32% water-miscible oligosaccharides.

26.4 grams of the main hydrolysate solution are slowly added into about 53 grams, twice the amount of the main hydrolysate solution, of 95% ethanol while stirring, thereby forming a large amount of tiny precipitates. The precipitates are filtrated by filtration and washed with 8 grams of 95% ethanol for twice, thereby obtaining the oligosaccharide precipitates and the filtrate. The oligosaccharide precipitates are dissolved by about 15 grams of water, then added the sulfuric acid, resulting 30 grains of a solution containing 10% acid by weight. The solution is kept in water at 88☐ temperature for 120 min. During the heating, the steam vaporized from the solution is condensed, thereby recovering the ethanol absorbed by the oligosaccharide precipitates. The sulfuric acid in the solution is neutralized by lime, thereby forming calcium sulfate precipitates which are removed by filtration, therefore obtaining a glucose solution. Analysis of the glucose solution shows that the recovery rate of reducing sugars is 58% of the theory recovery rate, and the acid recovery rate is 80%.

The filtrate containing the sulfuric acid and the alcohol is put in a flask which is ligated with a condensation pipe. The flask is heated to 170☐ quickly. During the heating, some condensate, which is ethanol, and some non-condensable gas, which is ethylene, are collected. At the same time, the sugars remained in the filtrate (about 35% of the theory recovery rate) are further hydrolyzed into levulinic acid, which is reacted with ethanol under the canalization of sulfuric acid into ethyl levulinate. Then the ethyl levulinate is extracted with benzene and the sulfuric acid left in the filtrate is recycled for reuse. In this embodiment, the method to recover the acid is reaction distillation (RD) which brings byproduct of bio-ethylene and biodiesel ethyl levulinate.

For facilitating description of sulfuric acid recovery method, the main hydrolysate solution prepared in this example can also be utilized as the materials in some of the following examples and a detail description of preparing method for which will be omitted in those examples.

Example 2

In this example, deerhair, which is retreated to remove the hemicelluloses and part of the lignin and essentially keep single celluloses, is utilized as the plant cellulose material for preparing the main hydrolysate solution.

An initial hydrolysate solution is prepared with about 19% of the total acid 16.5 grams of 98% sulfuric acids by weight, that is 3.1 grams of 98% sulfuric acid by weight, and 1.1 grams of water, which are added together to obtain an 72% sulfuric acid solution by weight. The initial hydrolysate solution is cooled to room temperature. The retreated deerhair is prepared in a quantity of 10.6 grams and containing about 13% by weight of water, are weighted and mixed with the initial hydrolysate solution. At room temperature, 1 grams of the retreated deerhair are firstly added into the initial hydrolysate solution, with stirring, to dissolve the deerhair, thereby resulting a dark brown hydrolysate solution, then 1 grains of 98% sulfuric acids by weight are added into the dark brown hydrolysate solution, with stirring to mix well, then 1 grams of the retreated deerhair are added, with stirring, to dissolve the deerhair. Repeat the procedure of adding the retreated deerhair the sulfuric acid until the last amount of all of 16.5 grams 98% of the sulfuric acids by weight and 10.6 grams of the retreated deerhair are added, with stirring, to dissolve, then the solution is put into 48~50☐ water and kept for 8 min, thereby obtaining the dark brown main hydrolysate solution.

The main hydrolysate solution is slowly added into 56 grams, which are twice the amount of the hydrolysate solution, of 95% ethanol, while stirring, thereby forming a large amount of tiny precipitates. The precipitates are filtrated by filtration and washed with 8 grams of 95% ethanol for twice, thereby obtaining the oligosaccharide precipitates and the filtrate. The oligosaccharide precipitates are dissolved by about 15 grams of water, then added the sulfuric acid, resulting 30 grams of a solution containing 10% acid by weight. The solution is kept in water at 88☐ temperature for 120 min. During the heating, the steam vaporized from the solution is condensed, thereby recovering the alcohol absorbed by the oligosaccharide precipitates. Then the solution is filtrated to remove the insoluble residues such as ligins etc., thereby obtaining the pale yellow sugars liquid. The sulfuric acid in the sugars liquid is neutralized by lime, thereby forming calcium sulfate precipitates which are removed by filtration, then resulting the glucose solution. Analysis of the glucose solution shows that the yield of reducing sugar is 3.0 grams; the acid yield is 75.6%. Water is added into a small amount of the ethanol filtrate to adjust the concentration of acid to 10% by weight, then kept in water at 88□ for 120 min. Analysis of the content if the reducing sugars shows that the yield of the reducing sugar is 3.1 grams in the ethanol filtrate, and 49.2% of the reducing sugar exists in the sugars liquid, 49.2% of the reducing sugar exists in the ethanol filtrate. The residues ligins are washed and dried, then weighted, which are 3.2 grams.

Example 3

In this example, n-pentanol is utilized as a precipitant, which essentially does not dissolve in water and the solubility is only 1.7% in water.

26.4 grams of the main hydrolysate solution as described in the example 1 are slowly added into 110 ml (about 89 grams, 3.4 times of the amount of the hydrolysate solution) of n-pentanol, thereby forming tiny precipitates, which is placed for 15 min to precipitate completely. Then the precipitates are filtrated by filtration, thereby obtaining oligosaccharide precipitates and a pale yellow and clear filtrate containing the sulfuric acid and the n-pentanol. The precipitates are washed with 10 ml of n-pentanol, and then washed with benzene. The n-pentanol absorbed by the precipitates is extracted into the benzene, then the benzene and the n-pentanol are separated by distillation, and the two are recycled to reuse. The filtrate containing the sulfuric acid and the n-pentanol is fed into a countercurrent extractor and extracted by water, thereby obtaining the n-pentanol and a 15% dilute sulfuric acid by weight, from which the concentrated sulfuric acid is available by distilling some water, and the two are recycled to reuse.

Analysis of the glucose solution shows that the recovery rate of reducing sugars is 93.2% of the theory recovery rate; the acid recovery rate is 81.6%.

The water-miscible alcohol can not dissolve the sugars, thereby the yield of the sugars is nearly the theory yield, and only washed for once, the yield of acid passes over 80%.

Example 4

In this example, n-octanol is utilized as a precipitant, which essentialy does not dissolve in water, the solubility is only 0.01~0.05% in water.

26.4 grams of the main hydrolysate solution as described in the example 1 are slowly added into 150 ml (about 120 grams, 4.5 times of the amount of the hydrolysate solution) of n-octanol, thereby forming tiny precipitates, which is placed for 15 min to precipitate completely. Then the precipitates are filtrated by filtration, thereby obtaining oligosaccharide precipitates and a pale yellow and clear filtrate containing the sulfuric acid and the n-octanol. The precipitates are washed with 10 ml of n-octanol for twice. When the precipitates dissolve in the dilute acid, the n-octanol absorbed by the precipitates will layer with water and floats on the surface of the liquid, which can be recovered by directly sucking out. The filtrate containing the sulfuric acid and the n-octanol is fed into a countercurrent extractor and extracted by water, thereby obtaining n-octanol and an about 15% dilute sulfuric acid by weight, from which the concentrated sulfuric acid is available by distilling some water, and the two are recycled to reuse. Analysis of the glucose solution shows that the recovery rate of reducing sugars is 93.8% of the theory recovery rate; the acid recovery rate is 93.3%.

Example 5

In this example, tetrahydrofuran is utilized as a precipitant, which is a water-miscible cyclic ether.

24.4 grams of the main hydrolysate solution as described in the example 1 are slowly added into 120 ml (about 95 grams, 3.9 times of the amount of the hydrolysate solution) of tetrahydrofuran, thereby forming tiny precipitates, which is placed for 15 min to precipitate completely. Then the precipitates are filtrated by filtration, thereby obtaining oligosaccharide precipitates and a pale yellow and clear filtrate containing the sulfuric acid and the tetrahydrofuran. The precipitates are washed with 10 ml of tetrahydrofuran for once, and then washed with benzene. The tetrahydrofuran absorbed by the precipitates is extracted into the benzene, then the benzene and the tetrahydrofuran are separated by distillation, and the two are recycled to reuse. Because the tetrahydrofuran has low boiling point and high volatility, it can be separated from the sulfuric acid by vacuum distillation, when the separation is nearly finished, a small amount of water is added to damage oxonium and free the reacting tetrahydrofuran, the vacuum distillation is continued until the tetrahydrofuran is completely steamed out, the left acid solution is heated to steam out the added water, then recycled for reuse. Analysis of the glucose solution shows that the recovery rate of reducing sugars is 92.3% of the theory recovery rate, the acid recovery rate is 67.4%. The filtrate containing the sulfuric acid and the tetrahydrofuran is fed into a countercurrent extractor and extracted by water, thereby obtaining the tetrahydrofuran and a 15% dilute sulfuric acid by weight, from which the concentrated sulfuric acid is available by distilling some water, and the two are recycled to reuse.

Analysis shows that the recovery rate of reducing sugars is 93.2% of the theory recovery rate; the acid recovery rate is 81.6%.

Example 6

In this example, ethylene glycol dimethyl ether is utilized as a precipitant, which is a water-miscible ether.

8.0 grams of the main hydrolysate solution as described in the example 1 are slowly added into 16 grams (about 2 times of the amount of the hydrolysate solution) of ethylene glycol dimethyl ether, thereby forming tiny precipitates, which are placed for 15 min to precipitate completely. Then the precipitates are filtrated by filtration, thereby obtaining oligosaccharide precipitates and a pale yellow and clear filtrate containing the sulfuric acid and the ethylene glycol dimethyl ether. The precipitates are washed with 5 ml of ethylene glycol dimethyl ether for twice, and then washed with chloroform. The ethylene glycol dimethyl ether absorbed by the precipitates is extracted into the chloroform, then the chloroform and the ethylene glycol dimethyl ether are separated by distillation, and the two are recycled to reuse. The filtrate containing the sulfuric acid and the ethylene glycol dimethyl ether is fed into a countercurrent extractor and extracted ethylene glycol dimethyl ether by chloroform. When the extraction is finished, the solution still contained residual sulfuric acid and ethylene glycol dimethyl ether. A small amount of water is added to damage oxonium and free ethylene glycol dimethyl ether, which is again extracted by chloroform in the countercurrent extractor, thereby separating and obtaining the ethylene glycol dimethyl ether and a sulfuric acid solution. Analysis shows that the recovery rate of reducing sugars is 91.3% of the theory recovery rate; the acid recovery rate is 79.4%.

Example 7

In this example, acetone is utilized as a precipitant, which is a water-miscible ketone.

26.4 grams of the main hydrolysate solution as described in the example 1 are slowly added into 52 grams (2 times of the amount of the hydrolysate solution) of acetone, thereby forming tiny precipitates. Because the acetone will condensate under the function of sulfuric acid, the precipitates are filtrated by filtration once the formation of the precipitates, thereby obtaining oligosaccharide precipitates and a pale yellow and clear filtrate containing the sulfuric acid and the acetone. The precipitates are washed with 10 ml of acetone for twice, and then washed with benzene. The acetone absorbed by the precipitates is extracted into the benzene, then the benzene and the acetone is separated by distillation, and the two are recycled to reuse. Because the acetone has low boiling point and high volatility (the vapor pressure is 30.56 kp at 25☐), it can be separated from the sulfuric acid by vacuum distillation, that is the vacuum distillation is on-going at room temperature until all of the acetone is steamed out. Then ketone derivatives formed by the acetone condensation under the function of sulfuric acid with high boiling point is extracted by benzene, thereby separating the acetone from the sulfuric acid, the two are recycled to reuse. Analysis shows that the recovery rate of reducing sugars is 92.5% of the theory recovery rate; the acid recovery rate is 75.4%.

Example 8

In the example, butanone is utilized as a precipitant, the solubility of which is 22.6% in water at 20☐.

26.4 grams of the main hydrolysate solution as described in the example 1 are slowly added into 65 grams (2.5 times of the amount of the hydrolysate solution) of butanone, thereby forming tiny precipitates. Because the butanone will condensate under the function of sulfuric acid, the precipitates are filtrated by filtration once the formation of the precipitates, thereby obtaining oligosaccharide precipitates and a pale yellow and clear filtrate containing the sulfuric acid and the butanone. The precipitates are washed with 10 ml of butanone for twice, and then washed with benzene. The butanone absorbed by the precipitates is extracted into the benzene, then the benzene and the butanone are separated by distillation, and the two are recycled to reuse. Because the butanone has low boiling point and high volatility (the vapor pressure is 12.08 kp at 25☐), it can be separated from the sulfuric acid by vacuum distillation, that is the vacuum distillation is on-going at room temperature until all of the butanone is steamed out. Then ketone derivatives formed by the butanone condensation under the function of sulfuric acid with high boiling point is extracted by benzene, thereby separating the butanone from the sulfuric acid, the two are recycled to reuse. Analysis shows that the recovery rate of reducing sugars is 92.5% of the theory recovery rate; the acid recovery rate is 72.0%.

Example 9

In this example, diethylene glycol monobutyl ether is utilized as a precipitant, which is a multifunctional organic solvent containing alcohol functional groups and ether functional groups and which is water-miscible.

10.0 grams of the main hydrolysate solution as described in the example 1 are slowly added into 30 grams (3 times of the amount of the hydrolysate solution) of diethylene glycol monobutyl ether, with stirring greatly, thereby forming tiny precipitates. The precipitates are filtrated by filtration, thereby obtaining oligosaccharide precipitates and a pale yellow and clear filtrate containing the sulfuric acid and the diethylene glycol monobutyl ether. The precipitates are washed with 10 ml of the diethylene glycol monobutyl ether for twice, and then washed with benzene. The diethylene glycol monobutyl ether absorbed by the precipitates is extracted into the benzene, then the benzene and the diethylene glycol monobutyl ether are separated by distillation, the two are recycled to reuse. The filtrate containing the sulfuric acid and the diethylene glycol monobutyl ether is fed into a countercurrent extractor and extracted the diethylene glycol monobutyl ether by benzene, thereby obtaining the sulfuric acid and the benzene solution containing the diethylene glycol monobutyl ether, which is separated by distillation, thereby obtaining the benzene and the diethylene glycol monobutyl ether. The sulfuric acid, the benzene and the diethylene glycol monobutyl ether can be recycled for reuse. Analysis shows that the recovery rate of reducing sugars is 68.3% of the theory recovery rate; the acid V is 75.9%.

Example 10

In this example, the mixture of ethanol and n-octanol is used as a precipitant, which consists of 85% of 95% ethanol by weight and 15% of 99.8% n-octanol by weight.

26.4 grams of the main hydrolysate solution as described in the example 1 are slowly added into 53 grams (about 2 times of the amount of the hydrolysate solution) of the mixture of ethanol and n-octanol, thereby forming tiny precipitates. The precipitates are filtrated by filtration, thereby obtaining oligosaccharide precipitates and a pale yellow and clear filtrate containing the sulfuric acid and the precipitant of ethanol and n-octanol. The precipitates are washed with 10 ml of the precipitant of ethanol and n-octanol for twice, and then washed with benzene. The precipitant absorbed by the precipitates is extracted into the benzene, then the benzene and the precipitant are separated by distillation, and the two are recycled to reuse. The filtrate containing the sulfuric acid, the ethanol and the n-octanol is put in a flask which is ligated with a condense pipe. The flask is heated to 170☐ quickly. During the heating, some condensate, which is ethanol, and some non-condensable gas, which is ethylene, occur and are collect. At the same time, the sugars remaining in the filtrate further hydrolyze into levulinic acid, which is reacted with the ethanol under the catalyzation by sulfuric acid and produce ethyl levulinate. The ethyl levulinate and the n-octanol, which are not steamed out, are extracted by benzene, what is left is the sulfuric acid, which can be recycled for reuse. In the example, the method to recover the acid is reaction distillation (RD) which produces bio-ethylene and biodiesel ethyl levulinate. Analysis shows that the recovery rate of reducing sugars is 85.3% of the theory recovery rate, the acid recovery rate is 83.2%. Obviously, the ethanol, added the water-immiscible n-octanol, can improve the recovery rate of sugars and the recovery rate of acids.

Example 11

In this example, the mixture of ethylene glycol monomethyl ether and acetate is used as a precipitant, which consists of 70% of 99.5% ethylene glycol monomethyl ether by weight and 30% of 99.8% acetate by weight.

26.4 grams of the main hydrolysate solution as described in the example 1 are slowly added into 79 grams (3 times of the amount of the hydrolysate solution) of the precipitant of ethylene glycol monomethyl ether and acetate, thereby forming tiny precipitates. The precipitates are filtrated by filtration, thereby obtaining oligosaccharide precipitates and a pale yellow and clear filtrate containing the sulfuric acid and the precipitant. The precipitates are washed with 10 ml of the precipitant of ethylene glycol monomethyl ether and acetate, and then washed with benzene. The precipitant absorbed by the precipitates is extracted into the benzene. Then the benzene and the precipitant are separated by distillation, and the two are recycled to reuse. The filtrate containing the sulfuric acid and the ethylene glycol monomethyl ether and the acetate is fed into a countercurrent extractor and extracted by benzene, thereby obtaining the mixture of ethylene glycol monomethyl ether and acetate. When the extraction is finished, the solution still contains residual sulfuric acid and ethylene glycol monomethyl ether. A small amount of water is added to damage oxonium and free ethylene glycol monomethyl ether, which is again extracted by benzene in the countercurrent extractor, thereby separating and obtaining the ethylene glycol monomethyl ether and a sulfuric acid solution. The sulfuric acid solution is heated to steam out the added small amount of water for reuse.

Example 12

In this example, the mixture of ethylene glycol monomethyl ether and benzene is used as a precipitant, which consists of 80% of 99.5% ethylene glycol monomethyl ether by weight and 20% of 99.8% benzene by weight.

0.7 grams of the main hydrolysate solution as described in the example 1 are slowly added into 5 grams (7.1 times of the amount of the hydrolysate solution) of the precipitant of ethylene glycol monomethyl ether and benzene, thereby forming tiny precipitates. The precipitates are filtrated by filtration, thereby obtaining oligosaccharide precipitates and a pale yellow and clear filtrate containing the sulfuric acid and the precipitant. The precipitates are washed with benzene. The precipitant absorbed by the precipitates is extracted into the benzene, then the benzene and the precipitant are separated by distillation, and the two are recycled to reuse. The filtrate containing the sulfuric acid and the ethylene glycol monomethyl ether and the benzene is fed into a countercurrent extractor and extracted by benzene, thereby obtaining the ethylene glycol monomethyl ether. When the extraction is finished, the solution still contains residual sulfuric acid and ethylene glycol monomethyl ether. A small amount of water is added to damage oxonium and free ethylene glycol monomethyl ether which reacted, which is again extracted by benzene in the countercurrent extractor, thereby separating and obtaining the ethylene glycol monomethyl ether and a sulfuric acid solution. The sulfuric acid solution is heated to steam out the added small amount of water for reuse. Analysis shows that the recovery rate of reducing sugars is 55.0% of the theory recovery rate; the acid recovery rate is 54.5%.

Example 13

In this example, the mixture of N,N-dimethylformamide and acetonitrile is used as a precipitant, which consists of 40% of 99.5% N,N-dimethylformamide by weight and 60% of 99.8% acetonitrile by weight.

0.6 grams of the main hydrolysate solution as described in the example 1 are slowly added into 5 grams (8.3 times of the amount of the hydrolysate solution) of the precipitant of N,N-dimethylformamide and acetonitrile, thereby forming tiny precipitates. The precipitates are filtrated by filtration, thereby obtaining oligosaccharide precipitates and a pale yellow and clear filtrate containing the sulfuric acid and the precipitant. The precipitates are washed with chloroform. The precipitant absorbed by the precipitates is extracted into the chloroform, then the chloroform and the precipitant are separated by distillation, and the two are recycled to reuse. The filtrate containing the sulfuric acid, the N,N-dimethyl-formamide and the acetonitrile is fed into a countercurrent extractor and extracted by chloroform, thereby obtaining a sulfuric acid solution and a chloroform phase containing the N,N-dimethylformamide and the acetonitrile, which is separated from the chloroform by distillation. Analysis shows that the recovery rate of sugars is 67.1% of the theory recovery rate; the acid recovery rate is 74.9%.

Example 14

In this example, the mixture of N,N-dimethylformamide and propionic acid is used as a precipitant, which consists of 40% of 99.5% N,N-dimethylformamide by weight and 60% of 99.5% propionic acid by weight.

1.7 grams of the main hydrolysate solution as described in the example 1 are slowly added into 5 grams (3 times of the amount of the hydrolysate solution) of the precipitant of N,N-dimethylformamide and propionic acid, thereby forming tiny precipitates. The precipitates are filtrated by filtration, thereby obtaining oligosaccharide precipitates and a pale yellow and clear filtrate containing the sulfuric acid and the precipitant. The precipitates are washed with benzene, and then the precipitant absorbed by the precipitates is extracted into the benzene. The benzene and the precipitant are separated by distillation, and the two are recycled to reuse. The filtrate containing the sulfuric acid, the N,N-dimethyl-formamide and the propionic acid is fed into a countercurrent extractor and extracted by benzene, thereby obtaining a sulfuric acid solution and a benzene phase containing the N,N-dimethyl-formamide and the propionic acid, which are separated from the benzene by distillation.

Example 15

In this example, the post hydrolysate solution is utilized for adding a precipitant, and the water-miscible acetone is utilized as the precipitant 13.8 grams of water are added into 26.4 grams of the main hydrolysate solution as described in the example 1, thereby the sulfuric acid concentration is about 40% by weight. The solution is kept in 75□ water for 75 min, resulting 40.2 grams of the dark brown post hydrolysate solution. Determination shows that the yield of the reducing sugars in the post hydrolysate solution is 8.2 grams, which is 91.4% of the theory yield.

10 grams of the above post hydrolysate solution are slowly added into 46 grams (4.6 times of the amount of the hydrolysate solution) of acetone while stirring, thereby forming tiny precipitates. The precipitates are filtrated by filtration, thereby obtaining oligosaccharide precipitates and a pale yellow and clear filtrate containing sulfuric acid and acetone. The filtrate is ongoing vacuum distillation at room temperature until all of the acetone is steamed out, Then high boiling point ketone derivatives, produced by the acetone condensation under the function of sulfuric acid, is extracted by benzene, thereby separating the acetone from the sulfuric acid, the two are recycled to reuse. Analysis shows that the recovery rate of reducing sugars is 34.0% of the theory recovery rate; the acid recovery rate is 80.9%.

Compared with the results of the sugars in the main hydrolysate solution precipitated by acetone (that is the yield of the reducing sugars is the 92.5% of the theory yield, the yield of the acid is 75.4%), it can be known that the difference between the yields of acid is a little, but the difference between the yields of sugars is great. In the main hydrolysate solution, almost all of the sugars are precipitated to products, while in the post hydrolysate solution, only about ⅓ of the sugars are precipitated, that is to say, the oligosaccharides are more easily to precipitate than the monosaccharide, and the less is the amount of water in the solution, the more easily is the sugars to precipitate.

Example 16

In this example, n-hexanol is utilized as the precipitant, which is slightly soluble in water.

3 times of the amount of the hydrolysate solution n-hexanol are slowly added into 26.4 grams of the main hydrolysate solution in the example 1 while stirring, thereby forming tiny precipitates. The precipitates are filtrated by filtration, thereby obtaining oligosaccharide precipitates and a pale yellow and clear filtrate containing the sulfuric acid and the n-hexanol. The precipitates are washed with 10 ml n-hexanol for twice. The n-hexanol absorbed by the precipitates will layer with water and floats on the surface of the liquid, which can be recovered by directly sucking out.

50.0 grams of the above n-hexanol solution containing the sulfuric acid, in which the concentration of the sulfuric acid is 15.68%, that is 7.84 grams, is extracted by water in a funnel for four times at 20□, the amount of water respectively is 10 grams, 5 grams, 5 grams, 5 grams, every turn of extraction, shaking for 5 min, then stilling for layer and separating the water phase. Analysis the content of the sulfuric acid in it, the results are as follows:

| | | projects | | | |
|---|---|---|---|---|---|
| The times of extraction | the added water amount/ grams | the weight of the water phase/ grams | the content of $H_2SO_4$ in the water phase/ grams | the concentration of $H_2SO_4$ in the water phase/ % | the cumulative extracting rate of $H_2SO_4$/ % |
| 1 | 10.00 | 7.70 | 3.08 | 40.00 | 39.29 |
| 2 | 5.00 | 8.10 | 2.58 | 31.85 | 72.19 |
| 3 | 5.00 | 7.00 | 1.49 | 21.29 | 91.20 |
| 4 | 5.00 | 5.10 | 0.62 | 12.16 | 99.11 |

40% of the dilute sulfuric acid solution is condensed to 95% in a triple-effect evaporator at atmospheric pressure, the vapor produced is heated to about 130□ and utilized as heat source for sterilization and distillation in the process of ethanol formation, thereby the condensation of the dilute sulfuric acid is essential free procedure in energy consumption.

Analysis of the examples 3, 4 and 16, it can be discovered that in these examples all of the alcohols precipitating the sugars in the main hydrolysate solution are water-immiscible, so after the precipitant is removed by filtration, the filtrate is an acid-alcohol solution, from which the water can be utilized as extractant to extract the sulfuric acid in it.

In addition, in the above examples 3, 4 and 16, the method to extract the sulfuric acid in the acid-alcohol solution using water as extractant, the acid-alcohol solution is not limited to that the sugars precipitant is removed by filtration, only if the hydrolysate solution (including the main hydrolysate solution and the post hydrolysate solution) is the acid-alcohol solution which is obtained by separating the sugars in it with water-immiscible alcohol. The follows are examples.

Example 17

The plant cellulose materials react with 75% sulfuric acid at 50□ for 10 min, thereby obtaining the main hydrolysate solution, water is added to dilute the condensation of the sulfuric acid to 50%, reacts at 90□ for 20 min, thereby obtaining the post hydrolysate solution. Analysis shows that the post hydrolysate solution consists of 53.9% of sulfuric acid, 4.5% of monosaccharide, 41.6% of water by weight.

At room temperature, 50.0 grams of the above post hydrolysate solution are extracted for times with n-pentanol in the radio of 1:1, thereby obtaining a series of an n-pentanol phases containing sulfuric acid with different concentration and a series of raffinate phases containing monosaccharide, in which the first n-pentanol phase contained the most amount of sulfuric acid, up to 23.458 grams, the condensation of sulfuric acid is 25.55%, the first extracting rate is up to 87.04%. 5.00 grams of water are utilized to re-extract the sulfuric acid in each of the first n-pentanol phases; the results are as follows:

| | | projects | | | |
|---|---|---|---|---|---|
| The times of extraction | The added water amount/ grams | The weight of the water phase/ grams | The content of $H_2SO_4$ in the water phase/grams | The concentration of $H_2SO_4$ in the water phase/ % | The cumulative extrating rate of $H_2SO_4$/ % |
| 1 | 5.00 | 13.50 | 5.567 | 41.2 | 23.73 |
| 2 | 5.00 | 12.50 | 4.627 | 37.0 | 43.46 |
| 3 | 5.00 | 11.90 | 4.031 | 33.9 | 60.64 |
| 4 | 5.00 | 10.00 | 3.340 | 33.4 | 74.88 |
| 5 | 5.00 | 8.80 | 2.238 | 25.4 | 84.42 |
| 6 | 5.00 | 7.60 | 1.687 | 22.2 | 91.61 |
| 7 | 5.00 | 6.50 | 1.034 | 15.9 | 96.02 |

-continued

| The times of extraction | The added water amount/ grams | The weight of the water phase/ grams | The content of $H_2SO_4$ in the water phase/grams | The concentration of $H_2SO_4$ in the water phase/ % | The cumulative extrating rate of $H_2SO_4$/ % |
|---|---|---|---|---|---|
| 8 | 5.00 | 5.50 | 0.497 | 9.0 | 98.14 |
| 9 | 5.00 | 4.80 | 0.231 | 4.8 | 99.12 |

The re-extraction of water to the n-pentanol phase containing sulfuric acid results a n-pentanol solution containing a little amount (about 0.4%) of sulfuric acid and a series of sulfuric acid solutions with different concentration. the n-pentanol solution is recycled for reuse, the sulfuric acid solutions are condensed and then recycled for reuse.

Example 18

At room temperature, 50.0 grams of the post hydrolysate solution in example 17 is extracted for times with n-octanol in the radio of 1:1, thereby obtaining a series of n-octanol phases containing sulfuric acid with different concentration and a series of raffinate phases containing monosaccharide, in which the first n-pentanol phase contained the most amount of sulfuric acid, up to 12.526 grams, the concentration of sulfuric acid is 17.92%, the first extracting rate is 46.60%. 5.00 grams of water is utilized to re-extract the sulfuric acid in each of the first n-octanol phase, the results are as follows:

| The times of extraction | The added water amount/ grams | The weight of the water phase/grams | The content of $H_2SO_4$ in the water phase/grams | The concentration of $H_2SO_4$ in the water phase/ % | The cumulative extrating rate of $H_2SO_4$/ % |
|---|---|---|---|---|---|
| 1 | 5.00 | 12.10 | 4.887 | 40.4 | 38.90 |
| 2 | 5.00 | 10.20 | 3.743 | 36.7 | 68.68 |
| 3 | 5.00 | 8.70 | 2.488 | 28.6 | 88.46 |
| 4 | 5.00 | 6.70 | 1.226 | 18.3 | 98.22 |
| 5 | 5.00 | 4.70 | 0.178 | 3.8 | 99.63 |

The re-extraction of water to the n-octanol phase containing sulfuric acid resulted a n-octanol solution containing a little amount (about 0.2%) of sulfuric acid and a series of sulfuric acid solution with different concentration. The n-octanol solution is recycled for reuse; the sulfuric acid solution is condensed and then recycled for reuse.

The water-miscible alcohols in the above examples are allowed to contain a little portion of other organic solvents, such as water-miscible alcohols, e.g. ethanol, n-propanol, etc., which dissolve a little amount in the sulfuric acid solution, however which are steamed out by the vapor when the dilute sulfuric acid solution is condensed by distillation, thereby separating from the sulfuric acid solution.

According to the above examples of 3, 4, 16-18, it can be known that the method to extract the sulfuric acid in the acid-alcohol solution, in which water is utilized as extractant, has an high extraction rate and obtains an high concentration of sulfuric acid. At the same time, this method avoids the use of poisonous, inflammable and explosive organic solvents. Especially condensation process of the dilute sulfuric acid can be conducted at atmospheric pressure, and the produced vapor can be utilized as the heat source for ethanol distillation. Thus, the procedure of condensing the sulfuric acid is an essentially free process in energy consumption, thereby greatly reducing the cost of preparing the biofuel and biochemical production with plant cellulose materials.

What is claimed is:
1. A method for recovering sulfuric acid from concentrated acid main hydrolysate of plant cellulose material, comprising the steps of:
(1) mixing the concentrated acid main hydrolysate of plant cellulose material with a liquid organic precipitant which has a property of precipitating sugars, thereby precipitating sugars from the main hydrolysate;
(2) conducting solid-liquid separation, thereby obtaining a sugar precipitate and an organic precipitant solution containing sulfuric acid; and
(3) separating the organic precipitant solution into a sulfuric acid solution and the liquid organic precipitant;

wherein said liquid organic precipitant is selected from the group consisting of water-immiscible alcohols having more than 4 carbon atoms, and ketones.

2. The method of claim 1, wherein said liquid organic precipitant includes a first component and a second component, the first component is an organic solvent that can completely dissolve the main hydrolysate, the second component is an organic solvent that can reduce the solubility of the sugars.

3. The method of claim 2, wherein said first component is an amide organic solvent, said second component is a nitrile organic solvent, a carboxylic acid organic solvent, or a nitro compound organic solvent.

4. The method of claim 1, wherein said step (3) of separating the organic precipitant solution into a sulfuric acid solution and the liquid organic precipitant is performed by ordinary distillation, vacuum distillation, reaction distillation, water extraction, or organic solvent extraction.

5. The method of claim 1, wherein said acid in step (1) is sulfuric acid or a mixture of acids mainly containing sulfuric acid.

6. A method for recovering sulfuric acid from concentrated acid hydrolysate of plant cellulose material comprising the steps of:
   (1) mixing a water-immiscible alcohol with the concentrated acid hydrolysate of plant cellulose material, thereby separating sugars from the hydrolysate with a remainder of acid-alcohol solution containing sulfuric acid;
   (2) contacting the acid-alcohol solution with water, thereby the sulfuric acid entering into the water phase from the organic phase; and
   (3) separating the organic phase and the water phase, thereby obtaining a sulfuric acid-water solution and the alcohol.

7. The method of claim 6, wherein said water-immiscible alcohol in the step (1) contain a little portion of other organic solvents.

8. The method of claim 6, wherein said step (2) of contacting the acid-alcohol solution with water is performed by extracting in bathes or continuous extraction.

9. The method of claim 6, further comprising a step of concentrating said sulfuric acid-water solution by atmospheric distillation or vacuum distillation, thereby obtaining the concentrated sulfuric acid.

10. The method of claim 6, wherein said concentrated sulfuric acid hydrolysate is selected from main hydrolysate or post hydrolysate obtained from concentrated sulfuric acid hydrolysis of plant cellulose materials.

11. A method for recovering sulfuric acid from concentrated acid main hydrolysate of plant cellulose material, comprising the steps of:
   (1) mixing the concentrated acid main hydrolysate of plant cellulose material with a liquid organic precipitant which has a property of precipitating sugars, thereby precipitating sugars from the main hydrolysate;
   (2) conducting solid-liquid separation, thereby obtaining a sugar precipitate and an organic precipitant solution containing sulfuric acid; and
   (3) separating the organic precipitant solution into a sulfuric acid solution and the liquid organic precipitant;
   wherein said liquid organic precipitant includes a first component and a second component, the first component is an organic solvent that can completely dissolve the main hydrolysate, the second component is an organic solvent that can reduce the solubility of the sugars.

12. The method of claim 11, wherein said first component is an amide organic solvent, said second component is a nitrile organic solvent, a carboxylic acid organic solvent, or a nitro compound organic solvent.

* * * * *